United States Patent
Zhu et al.

(10) Patent No.: US 11,778,652 B2
(45) Date of Patent: Oct. 3, 2023

(54) MULTI COMPONENT CARRIER (CC) SCHEDULER

(71) Applicant: QUALCOMM Incorporated, San Diego, CA (US)

(72) Inventors: Jun Zhu, San Diego, CA (US); Yong Li, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/447,009

(22) Filed: Sep. 7, 2021

(65) Prior Publication Data
US 2023/0071270 A1    Mar. 9, 2023

(51) Int. Cl.
*H04W 72/542* (2023.01)
*H04L 5/00* (2006.01)
*H04W 72/12* (2023.01)
*H04W 72/044* (2023.01)
*H04W 72/02* (2009.01)

(52) U.S. Cl.
CPC ......... *H04W 72/542* (2023.01); *H04L 5/0032* (2013.01); *H04L 5/0098* (2013.01); *H04W 72/02* (2013.01); *H04W 72/044* (2013.01); *H04W 72/1215* (2013.01)

(58) Field of Classification Search
CPC .................................................. H04W 72/02
See application file for complete search history.

(56) References Cited

U.S. PATENT DOCUMENTS

| | | | | |
|---|---|---|---|---|
| 2011/0267955 | A1* | 11/2011 | Dalsgaard | H04W 24/00 370/241 |
| 2014/0233409 | A1* | 8/2014 | Lee | H04W 24/08 370/252 |
| 2019/0166608 | A1* | 5/2019 | Kumar | H04W 36/36 |
| 2019/0305803 | A1* | 10/2019 | Winiecki | H04B 1/0082 |
| 2020/0092875 | A1* | 3/2020 | Takeda | H04W 74/0833 |
| 2022/0077896 | A1* | 3/2022 | Jung | H04B 7/0408 |

FOREIGN PATENT DOCUMENTS

| WO | 2021014507 A1 | 1/2021 |
|---|---|---|
| WO | WO-2022097617 A1 * | 5/2022 |

OTHER PUBLICATIONS

Machine Translation of Matsumura (Year: 2022).*

* cited by examiner

*Primary Examiner* — Benjamin Lamont
(74) *Attorney, Agent, or Firm* — QUALCOMM Incorporated

(57) ABSTRACT

Certain aspects of the present disclosure provide a technique for wireless communications by a user equipment (UE). The UE implements the technique to select a number of component carriers (CCs) in both a first frequency range and a second frequency range. The UE determines a schedule for performing search and measurement in the selected number of CCs. The UE performs search and measurement in the selected CCs according to the determined schedule.

26 Claims, 9 Drawing Sheets

| Mode | FR1 and FR2 (assume # of UE PO beam = 8) | | |
|---|---|---|---|
| Periodicity | Search and Measurement | | |
| CDRX | Non-CDRX | CDRX <= 320ms | Otherwise |
| PCC | FR1: 600ms<br>FR2: 1440/8 = 180ms | FR1: 8max(SMTC, CDRX)<br>FR2: 108max(SMTC, CDRX)/8<br>=13.5CDRX | FR1: 5CDRX<br>FR2: 72CDRX/8<br>= 9CDRX |
| Act SCC | PCC periodicity*CSSFintra | | |
| Deact SCC | 6 x measCycleSCell/8 x CSSFintra | 6 x max(measCycleSCell, 1.5xCDRX)/8 x CSSFintra | 6 x max(measCycleSCell, CDRX)/8 x CSSFintra |

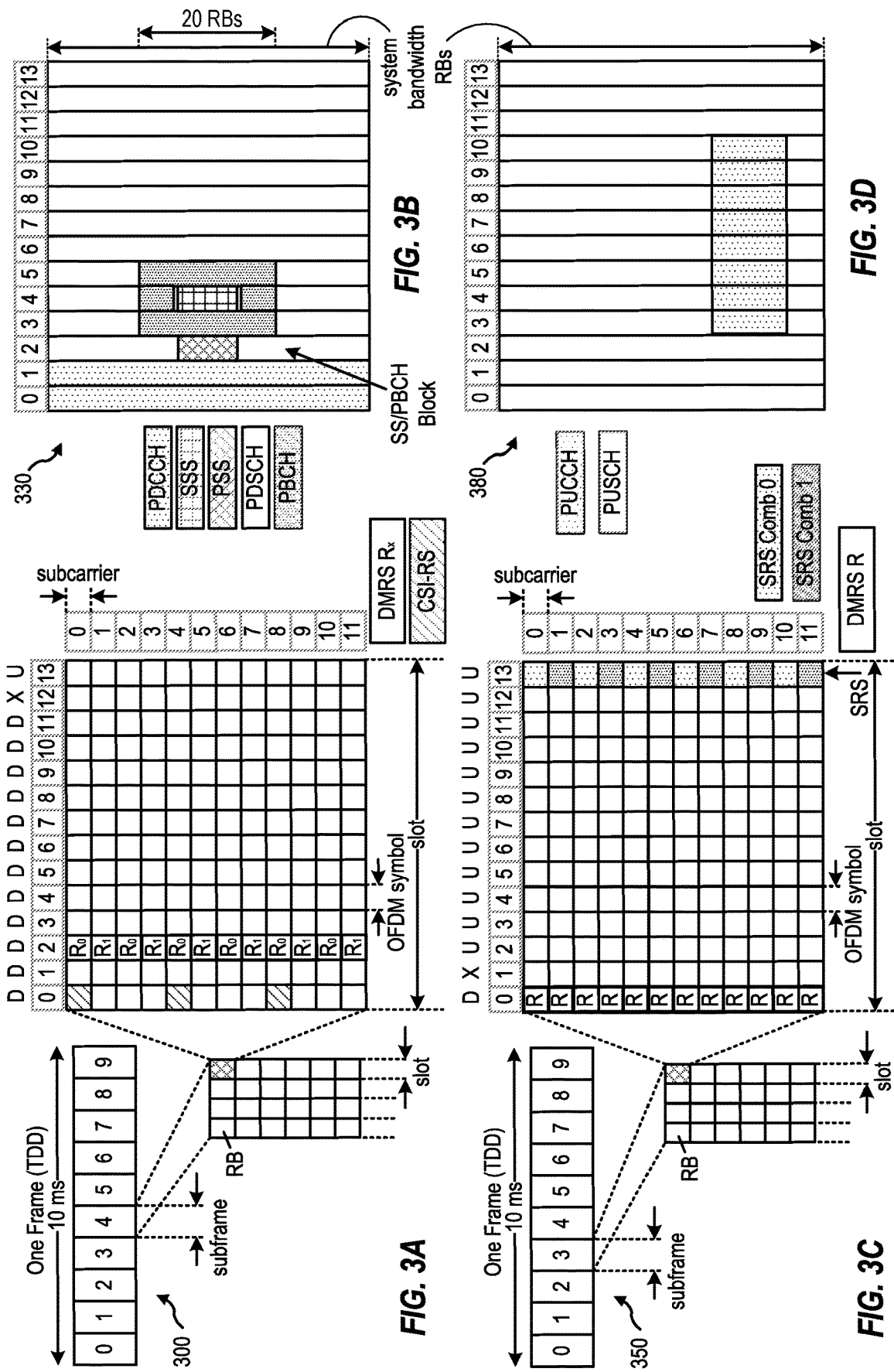

| Mode | FR1 and FR2 (assume # of UE PO beam = 8) | | |
|---|---|---|---|
| Periodicity | Search and Measurement | | |
| CDRX | Non-CDRX | CDRX <= 320ms | Otherwise |
| PCC | FR1: 600ms<br>FR2: 1440/8 = 180ms | FR1: 8max(SMTC, CDRX)<br>FR2: 108max(SMTC, CDRX)/8<br>=13.5CDRX | FR1: 5CDRX<br>FR2: 72CDRX/8<br>= 9CDRX |
| Act SCC | | PCC periodicity*CSSFintra | |
| Deact SCC | 6 x measCycleSCell/8 x CSSFintra | 6 x max(measCycleSCell, 1.5xCDRX)/8 x CSSFintra | 6 x max(measCycleSCell, CDRX)/8 x CSSFintra |

*FIG. 5*

MULTI COMPONENT CARRIER (CC) SCHEDULER

INTRODUCTION

Aspects of the present disclosure relate to wireless communications, and more particularly, to techniques for scheduling multiple component carriers (CCs) for both a first frequency range (FR1) and a second frequency range (FR2).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE), including: selecting a number of component carriers (CCs) in both a first frequency range and a second frequency range; determining a schedule for performing search and measurement in the selected number of CCs; and performing search and measurement in the selected CCs according to the determined schedule.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 5 depicts a table illustrating various specified search and measurement periodicities of different component carriers (CCs).

DETAILED DESCRIPTION

Aspects of the present disclosure provide apparatuses, methods, processing systems, and computer-readable mediums for scheduling multiple component carriers (CCs) for both a first frequency range (e.g., FR1 also referred to as "Sub-6 GHz") and a second frequency range (e.g., FR2 also referred to as "millimeter wave" or "mmWave").

According to certain aspects, a UE may select certain CCs (e.g., a primary CC (PCC) and at least one secondary CC (SCC)) in both a first frequency range and a second frequency range. The UE may determine a schedule for performing search and measurement in the selected CCs, and then perform search and measurement in the selected CCs according to the determined schedule. The schedule may be selected in an effort to enable the UE to save power, for example, by limiting how often the UE wakes up per connected mode discontinuous reception (CDRX) cycle to perform the search and measurement in the selected CCs.

The techniques may allow flexible scheduling of a UE, for example, to perform search and measurement procedures on a relatively large number of component carriers (CCs), with a limited number of narrow band (NB) radio frequency (RF) chains. The techniques may help ensure that various timelines (e.g., mandated by a standard specification) and performance objectives are met, while still saving power. In some cases, the timelines may change for different operating modes. For example, in a panic mode (which may be enabled by a user), a UE may perform search and measurement more often in an attempt to avoid loss of coverage under certain circumstances.

Introduction to Wireless Communication Networks

Figure 1:
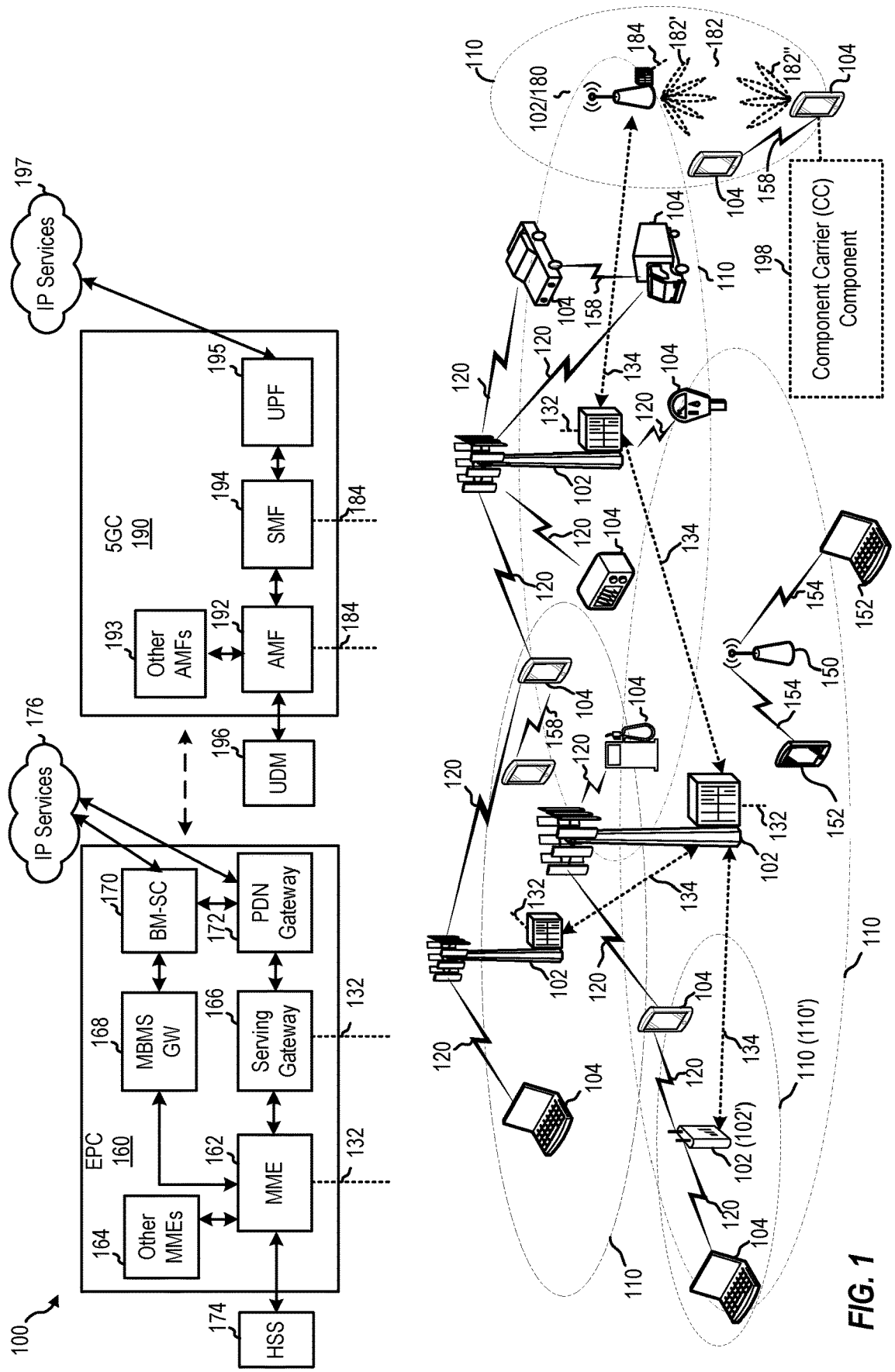
FIG. 1 is a block diagram conceptually illustrating an example wireless communication network.

FIG. 1 depicts an example of a wireless communications system 100, in which aspects described herein may be implemented.

Figure 6:
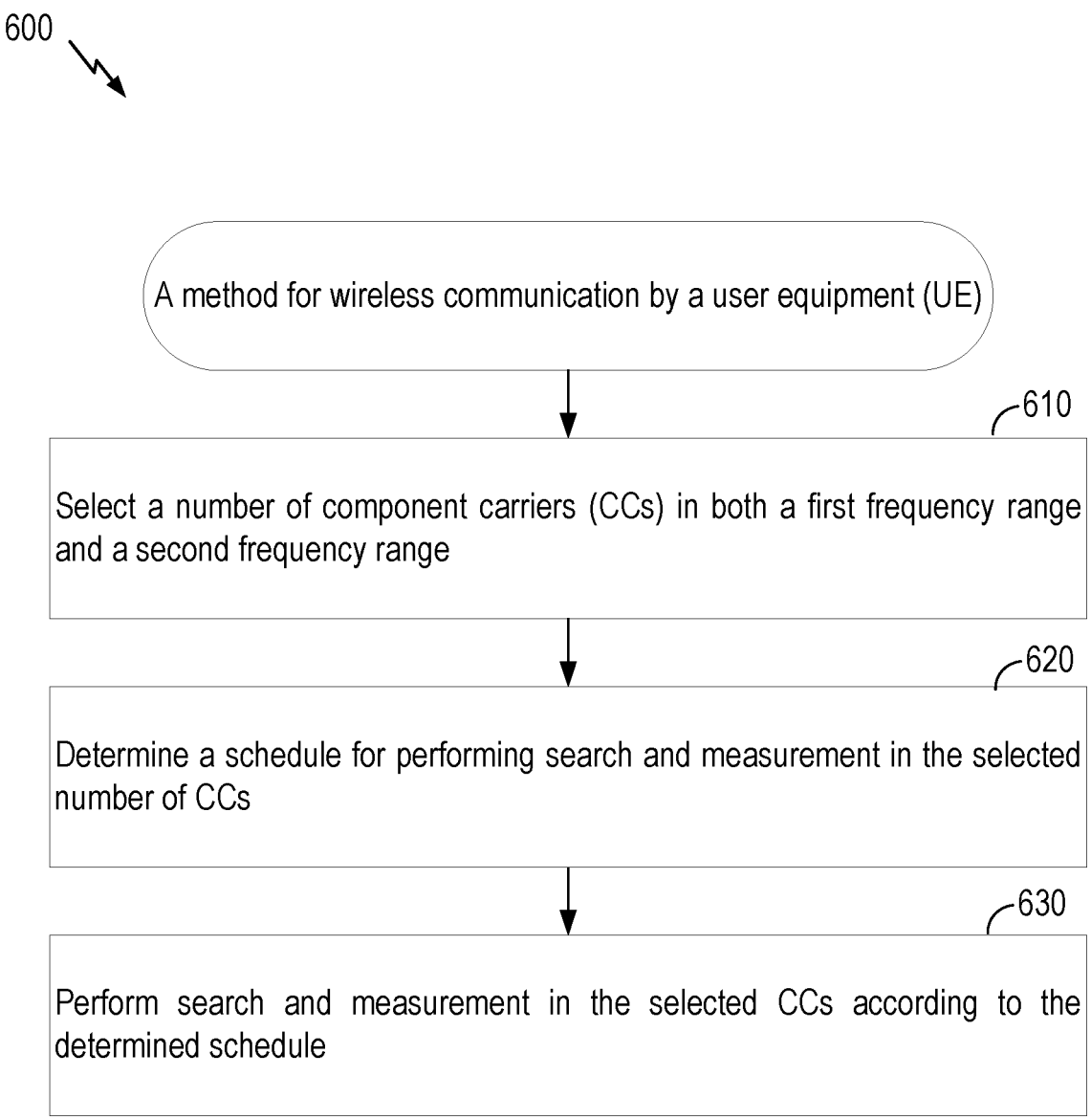
FIG. 6 depicts a flow diagram illustrating example operations for wireless communication by a UE.

For example, wireless communication system 100 may include a component carrier (CC) component 198, which may be configured to perform, or cause a user equipment (UE) 104 to perform, operations 600 of FIG. 6 to perform search and measurement operations on CCs in different frequency ranges (e.g., FR1 and FR2).

Generally, wireless communications system 100 includes base stations (BSs) 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs 102 may utilize beamforming 182 with a UE 104 to improve path loss and range. For example, the BS 102 and the UE 104 may each include a plurality of antennas, such as antenna elements, antenna panels, and/or antenna arrays to facilitate the beamforming.

In some cases, a BS 102 may transmit a beamformed signal to a UE 104 in one or more transmit directions 182'. The UE 104 may receive the beamformed signal from the BS 102 in one or more receive directions 182". The UE 104 may also transmit a beamformed signal to the BS 102 in one or more transmit directions 182". The BS 102 may also receive the beamformed signal from the UE 104 in one or more receive directions 182'. The BS 102 and the UE 104 may then perform beam training to determine the best receive and transmit directions for each of BS 102 and UE 104. Notably, the transmit and receive directions for the BS 102 may or may not be the same. Similarly, the transmit and receive directions for the UE 104 may or may not be the same.

Figure 2:
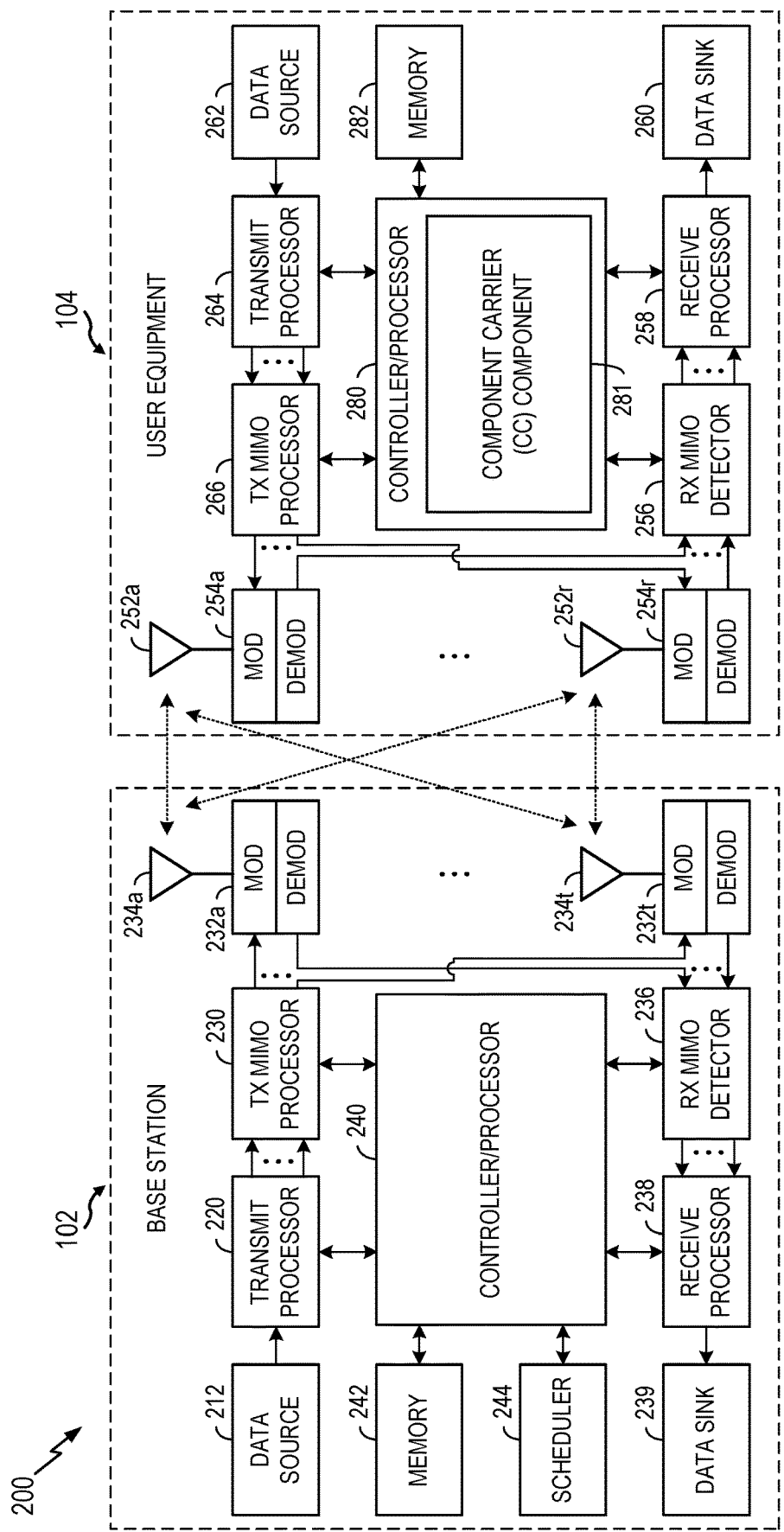
FIG. 2 is a block diagram conceptually illustrating aspects of an example base station (BS) and a user equipment (UE).

FIG. 2 depicts aspects of an example BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes a CC component 281, which may be representative of the CC component 198 of FIG. 1. Notably, while depicted as an aspect of controller/processor 280, the CC component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as 3rd Generation Partnership Project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a BS 102 configured to communicate using mmWave/near mmWave radio frequency bands may utilize beamforming (e.g., 182) with a UE 104 to improve path loss and range.

Further, as described herein, a UE implements a technique to select CCs in both FR1 and FR2, and then performs search and measurement in the selected CCs according to a schedule.

Introduction to C-DRX

Figure 4A:
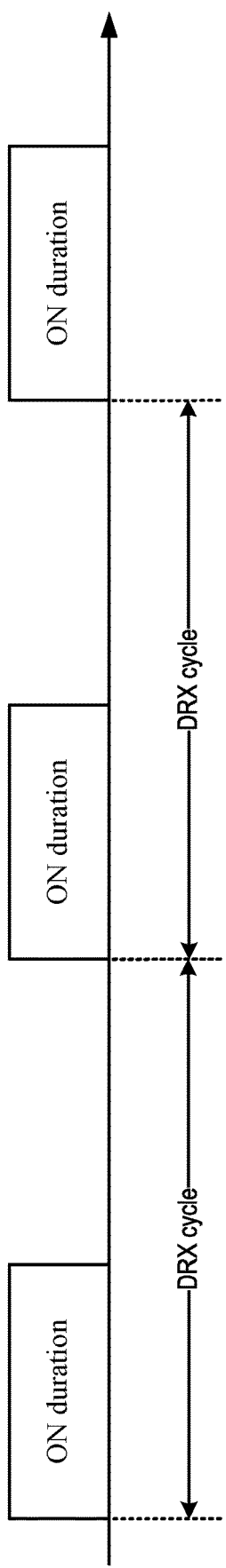
FIG. 4A illustrates an example timeline for discontinuous reception (DRX) cycles.
Figure 4B:
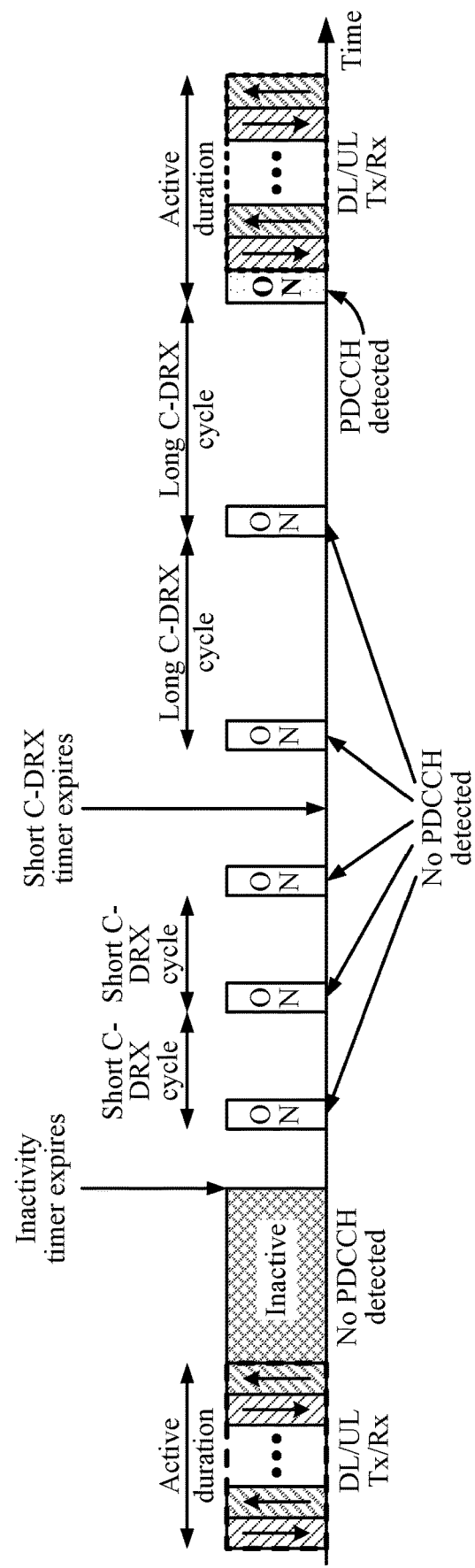
FIG. 4B illustrates an example timeline for connected DRX (C-DRX) operation.

As illustrated in FIG. 4A and FIG. 4B, during periods of traffic inactivity, a user equipment (UE) may switch to a connected discontinuous reception (C-DRX) operation for power saving. A UE may be configured for C-DRX according to various configuration parameters, such as an inactivity timer, a short DRX timer, a short DRX cycle, and a long DRX cycle.

Based on configured cycles, the UE wakes up occasionally for ON durations and monitors for physical downlink control channel (PDCCH) transmissions. Except for ON durations, the UE may remain in a low power (sleep) state referred to as an OFF duration, for the rest of C-DRX cycle. During the OFF duration, the UE is not expected to transmit and receive any signal.

In a C-DRX mode, a UE wakes up and transmits and/or receives (TX/RX) data packets following C-DRX cycle (during a C-DRX ON period). In some cases, if the UE detects a PDCCH scheduling data during ON duration, the UE remains ON to transmit and receive data. Otherwise, the UE goes back to sleep at the end of the ON duration. This type of C-DRX mode has been used many years and is still default behavior of some new radio (NR) networks and UEs.

In some cases, with periodic C-DRX cycles, a UE may wake up frequently even when the UE has no data to transmit and/or to monitor for data (e.g., indicated by a page), which wastes UE power. Enlarging a C-DRX cycle may cause UEs to wake up less often, but this may also lead to increased data service latency (e.g., if a UE has packets to transmit well before the next C-DRX on duration).

Aspects Related to Multi-CC Scheduler

A UE typically performs search and measurement in various frequencies, to support various procedures, such as handover to stronger cells or adding a new Carrier Component (CCs) in the case of Carrier Aggregation (CA). When performing search and measurement, a UE measures various cell signal strengths (using certain UE beams) of certain reference signals. For example, a UE may measure reference signal received power (RSRP) or reference signal received quality (RSRQ) of various signals transmitted in synchronization blocks (SSBs).

To maintain radio link quality and avoid drops in performance, a UE may be configured to perform search and measurement according to standards-specified timing requirements. A table shown in FIG. 5 illustrates example search and measurement periodicity requirements for different CCs for different frequency ranges under different modes.

The different modes may include an idle mode, a connected mode, a dual connectivity (DC) carrier aggregation (CA) mode, and a connected discontinuous reception (C-DRX) mode. In CA and DC modes, the different CCs may include a primary CC (PCC), an activated secondary CC (SCC), and a deactivated SCC. The different frequency ranges include a first frequency range (e.g., FR1) and a second frequency range (e.g., FR2). The second frequency range spans higher frequencies than the first frequency range.

One challenge to meet search and measurement timing requirements is that a UE may have limited radio frequency (RF) processing resources. Depending on the operating mode, a number of narrow band (NB) RF chains may be more or less than the number of CCs to measure. This may result in a UE re-tuning a same NB RF chain to different CCs at different times (e.g., according to a multi-CC scheduling technique).

For example, in some cases, a number of narrow bands (NB) chains of a UE may be more than a number of CCs supported by the UE. In one example case (e.g., for a first frequency range), a UE supports 2 CCs and 4 NB chains. In such cases, the UE may be able to perform search and measurement in both CCs without the need to employ a multi-CC scheduler.

In other cases, a number of NB chains of a UE may be less than a number of CCs supported by the UE. In one example case (e.g., for a second frequency range), a UE supports up to 8 CCs (intra-band only) and 4 NB chains. In such cases, since the UE is not able to (simultaneously) schedule all CCs due to a limited number of NB chains, the UE may implement a timer-based multi-CC scheduler technique. The technique may help to determine a schedule for performing search and measurement in the CCs (e.g., based on a timer maintained for each CC).

Such a multi-CC scheduling technique may be challenged to handle all use cases. For example, this technique is unable to handle a use case where there is only 1 NB chain. In addition, this technique does not support use cases where CCs may be used for inter-band carrier aggregation (CA) in the second frequency range and CA/dual connectivity (DC) in the first and second frequency ranges (e.g., FR1 and FR2).

Aspects of the present disclosure, however, provide techniques that may help enable a UE to schedule multiple CCs for both a first frequency range and a second frequency range, with a limited number of NB RF chains of a UE, in order to meet search and measurement periodicity requirements for different CCs and save power.

For example, a UE may implement a technique to select CCs in both a first frequency range and a second frequency range, and then perform search and measurement in the selected CCs according to a schedule. The techniques described herein may also help enable the UE to save power as the UE will wake up at most once per C-DRX cycle to perform the search and measurement in the selected CCs.

FIG. 6 depicts a flow diagram illustrating example operations 600 for wireless communication. The operations 600 may be performed, for example, by a UE (e.g., such as the UE 104 in the wireless communication network 100 of FIG. 1). The operations 600 may be implemented as software components that are executed and run on one or more processors (e.g., the controller/processor 280 of FIG. 2). Further, transmission and reception of signals by the mobile repeater in operations 600 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 600 begin, at 610, by selecting a number of CCs in both a first frequency range and a second frequency range. For example, the UE may select the CCs in both the first frequency range and the second frequency range using a processor, antenna(s) and/or transceiver components of the UE 104 shown in FIG. 1 or FIG. 2 and/or of the apparatus shown in FIG. 9.

At 620, the UE determines a schedule for performing search and measurement in the selected number of CCs. The UE may determine the schedule for performing the search and measurement in the selected number of CCs using a processor, antenna(s) and/or transceiver components of the UE 104 shown in FIG. 1 or FIG. 2 and/or of the apparatus shown in FIG. 9.

At 630, the UE performs search and measurement in the selected CCs according to the determined schedule. The UE may perform the search and measurement in the selected CCs using a processor, antenna(s) and/or transceiver components of the UE 104 shown in FIG. 1 or FIG. 2 and/or of the apparatus shown in FIG. 9.

Figure 7:
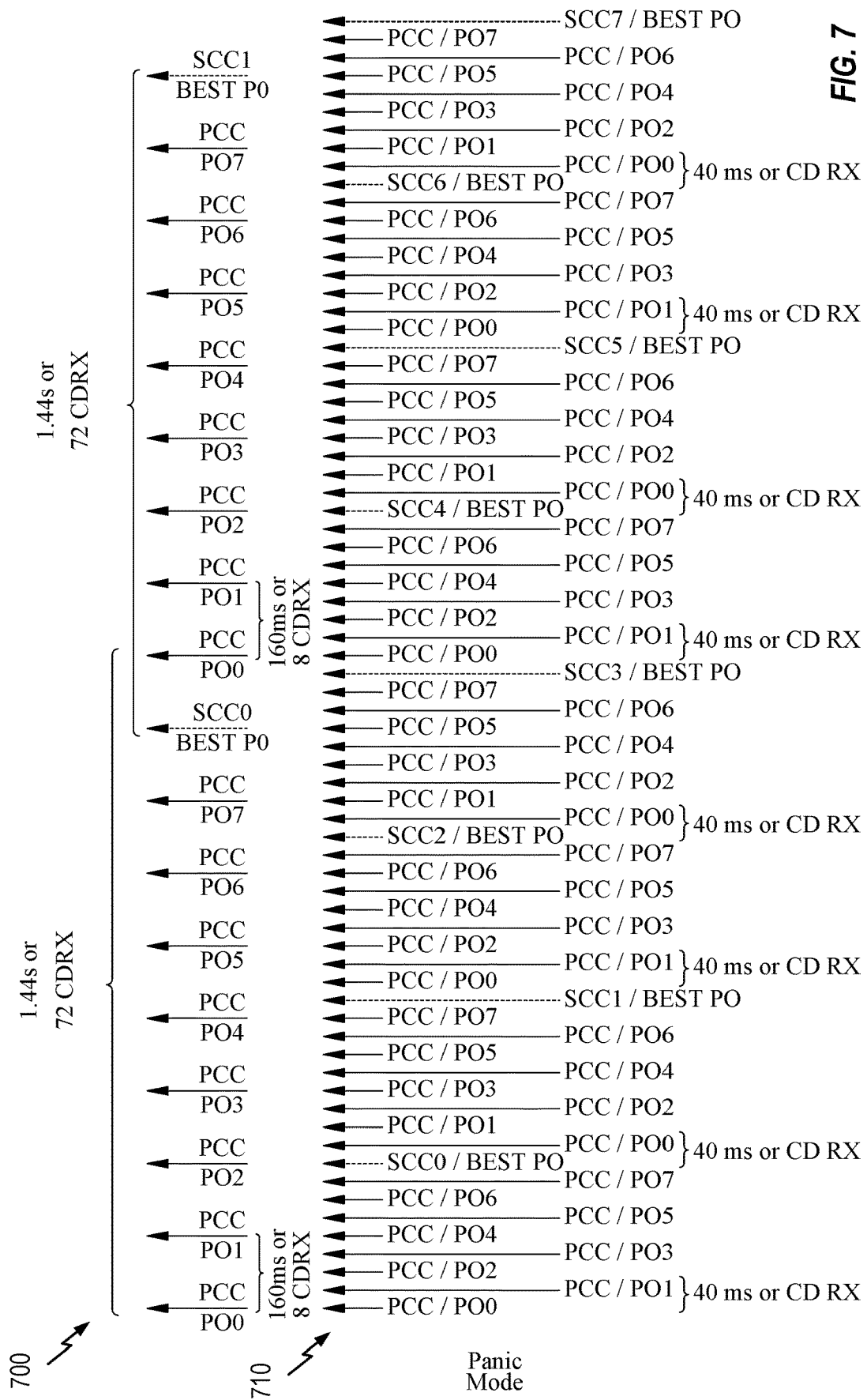
FIG. 7 depicts example second frequency range per-band multi-CC search and measurement scheduling.
Figure 8:
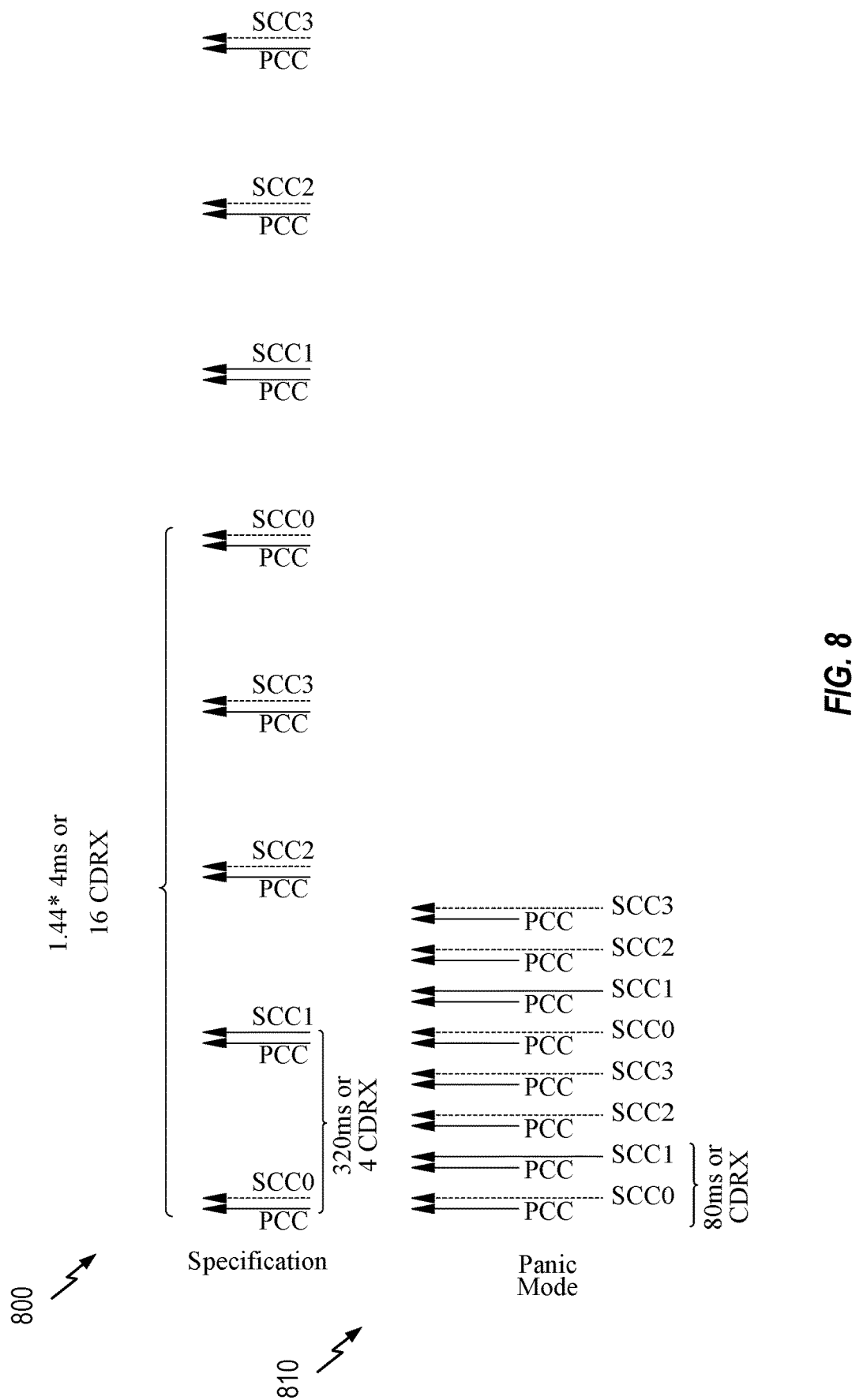
FIG. 8 depicts example first frequency range multi-CC search and measurement scheduling.

The operations shown in FIG. 6 may be understood with reference to FIGS. 7 and 8.

In some scenarios, a number of CCs selected by a UE in both a first frequency range and a second frequency range exceeds a number of NB RF chains of the UE. In one example, the number of CCs are used for DC involving different radio access technologies in the first and second frequency ranges. In another example, the number of CCs are used for CA in the first frequency range. In another example, the number of CCs are used for the CA in the second frequency range.

In certain aspects, a UE performs search and measurement in selected CCs using a plurality of UE beams. In one example, the UE beams may include pseudo-omni (PO) beams (e.g., 8 PO beams). As used in this context, the term Pseudo-Omni generally refers a beam or collective set of beams (e.g., swept in sequence) to provide near omni-directional (e.g., 360° horizontal) coverage.

In certain aspects, one NB RF chain is reserved for each frequency band (e.g., up to 2 frequency bands) of a second frequency range. In certain aspects, a single NB RF chain is used for search and measurement in all intra-band CCs (e.g., up to 8 CCs) of each frequency band of the second frequency range.

In certain aspects, a schedule determined by a UE may dictate beam sweeping a plurality of UE beams to perform search and measurement on a PCC at a first periodicity (e.g., using a different PO beam each period), and using a selected one of the plurality of swept UE beams to perform search and measurement on at least one SCC at a second periodicity. The UE may select the UE beam used to perform the search and measurement on the at least one SCC based on the beam sweeping of the plurality of UE beams to perform the search and measurement on the PCC.

As illustrated in FIG. 7, a UE may sweep (e.g., according to a round robin schedule) over all PO beams on a PCC, for example, per a first timeline 700, to meet a specification requirement, and per a second timeline 710, panic mode requirement for search and measurement on the PCC). The illustrated example assumes eight PO beams (e.g., PO 0 to PO 7).

As illustrated, a different PO beam is used to perform the search and measurement on the PCC every 160 ms or 8 C-DRX cycles. In the panic mode, a different PO beam is used to perform the search and measurement on the PCC every 40 ms or 1 C-DRX cycle. The UE may select a best PO beam from these PO beams (e.g., derived from the PCC). The UE uses the selected PO beam to perform the search and measurement on the SCC (e.g., SCC 0). In this illustrated example, it may be assumed that all intra-band SCCs are quasi-colocated (QCL)ed with the PCC (e.g., meaning it may be assumed they share certain channel characteristics).

In certain aspects, at least two NB RF chains are reserved for a first frequency range. In certain aspects, the UE may determine a schedule based on a timer (e.g., CC_timer) maintained by the UE for each CC (e.g., intra-band or inter-band CC) of the first frequency range. In one example, the timer maintained for each CC records remaining time until a next scheduling for each CC. A small value of the timer maintained for one CC may indicate this CC has a high priority (e.g., the UE has to perform search and measurement in this CC), and will rank high in a candidate CC list.

The UE may select a number of CCs corresponding to a number of available NB RF chains of the UE, based on values of the timers maintained for each CC of the first frequency range. For example, if there are "K" available NB RF chains of the UE, the UE selects top K CCs. In certain aspects, if multiple CCs have a same timer value, a CC with a shorter periodicity is given higher priority than a CC with a longer periodicity. For example, a PCC has higher priority than an activated SCC, and the activated SCC has a higher priority than a deactivated SCC.

As illustrated in FIG. 8, a UE selects PCC and 4 SCCs (e.g., SCC 0 to SCC 3) based on values of timers maintained for each CC of a first frequency range. The UE then performs search and measurement in the CCs using UE beams. As illustrated, per a first timeline 800, UE beams are used to perform the search and measurement on the PCC/SCC every 320 ms or 4 C-DRX cycles. In the panic mode, per a second timeline 810, UE beams are used to perform the search and measurement on the PCC/SCC every 80 ms or 1 C-DRX cycle.

As noted above, the techniques described herein may be applicable for following use cases where a number of CCs exceeds a number of NB RF chains of a UE.

In one example case (e.g., for a first frequency range only), a UE may support 6 CCs (1 PCC and 5 SCCs) for intra- or inter-band. In another example case (e.g., for a second frequency range only), a UE may support 8 CCs (1 PCC and 7 SCCs) for intra-band, and 4CCs (1 PCC and 3 SCCs)*2 bands (for inter-band). In another example case (e.g., a first frequency range and a second frequency range (DC/CA)), a UE may support 4 CCs (1 PCC and 3 SCCs) for the first frequency range, 8CCs (1PCC and 7 SCCs) for second frequency range intra-band, and 4CCs (1PCC and 3 SCCs)*2 bands for second frequency range inter-band.

Example Wireless Communication Device

Figure 9:
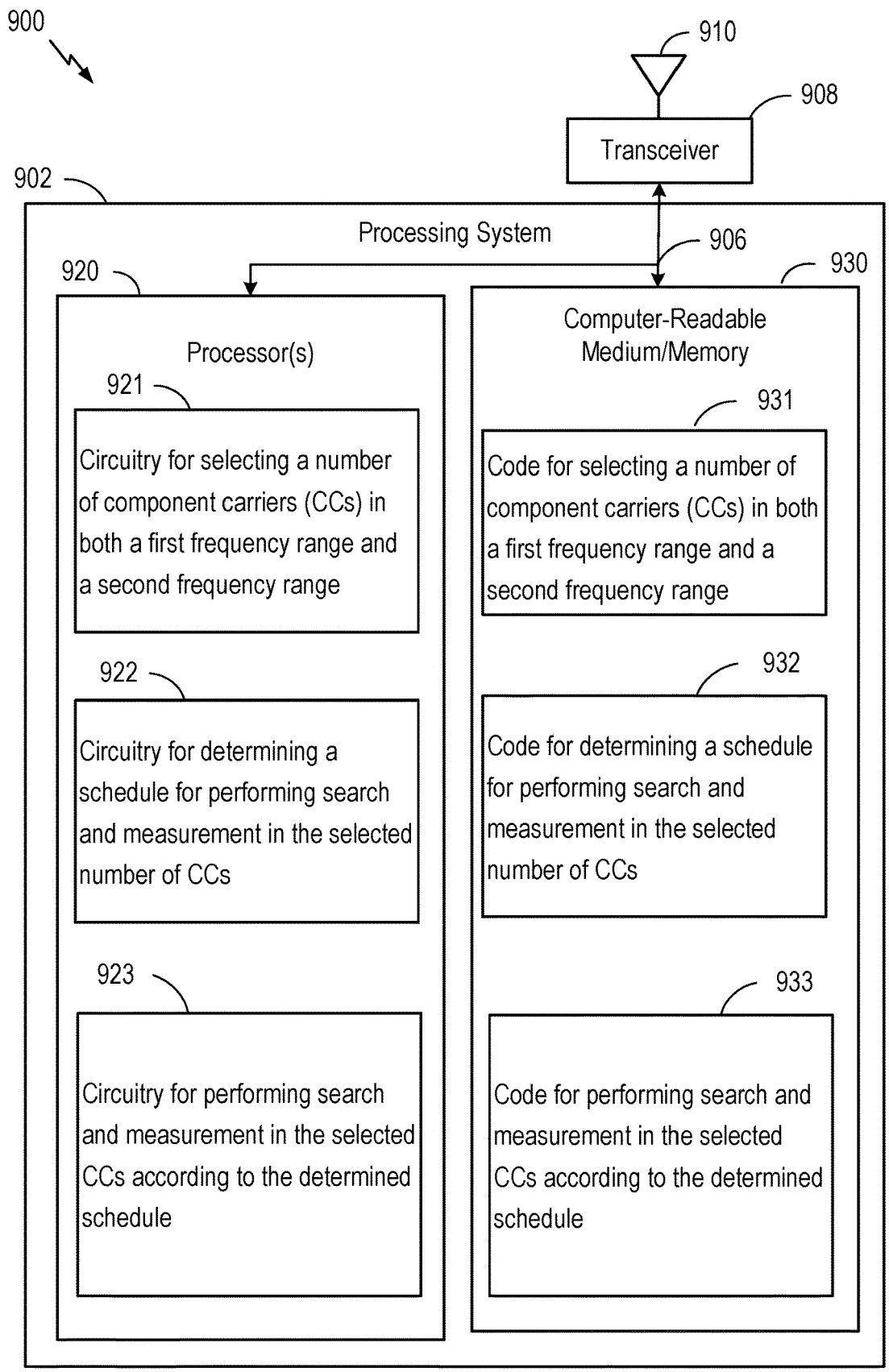
FIG. 9 depicts components of an example communications device.

FIG. 9 depicts an example communications device 900 that includes various components operable, configured, or adapted to perform operations for the techniques disclosed herein, such as the operations depicted and described with respect to FIG. 6. In some examples, communication device 900 may be a user equipment (UE) 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 6, or other operations for performing the various techniques discussed herein.

In the depicted example, computer-readable medium/memory 930 stores code 931 for selecting a number of component carriers (CCs) in both a first frequency range and a second frequency range, code 932 for determining a schedule for performing search and measurement in the selected number of CCs, and code 933 for performing search and measurement in the selected CCs according to the determined schedule.

In the depicted example, the one or more processors 920 include circuitry configured to implement the code stored in the computer-readable medium/memory 930, including circuitry 921 for selecting a number of CCs in both a first frequency range and a second frequency range, circuitry 922 for determining a schedule for performing search and measurement in the selected number of CCs, and circuitry 923 for performing search and measurement in the selected CCs according to the determined schedule.

Various components of communications device 900 may provide means for performing the methods described herein, including with respect to FIG. 6.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the UE 104 illustrated in FIG. 2 and/or transceiver 908 and antenna 910 of the communication device 900 in FIG. 9.

In some examples, means for selecting a number of CCs in both a first frequency range and a second frequency range, means for determining a schedule for performing search and measurement in the selected number of CCs, and means for performing search and measurement in the selected CCs according to the determined schedule, may include various processing system components, such as: the one or more processors 920 in FIG. 9, or aspects of the UE 104 depicted in FIG. 2, including receive processor 258, transmit processor 264, TX MIMO processor 266, and/or controller/processor 280 (including CC component 281).

Notably, FIG. 9 is an example, and many other examples and configurations of communication device 900 are possible.

Example Clauses

Implementation examples are described in the following numbered clauses:

Clause 1: A method for wireless communication by a user equipment (UE), comprising: selecting a number of component carriers (CCs) in both a first frequency range and a second frequency range; determining a schedule for performing search and measurement in the selected number of CCs; and performing search and measurement in the selected CCs according to the determined schedule.

Clause 2: The method of Clause 1, wherein the number of CCs exceeds a number of narrow band (NB) radio frequency (RF) chains of the UE.

Clause 3: The method of any one of Clauses 1-2, wherein the number of CCs are used for at least one of: dual connectivity (DC) involving different radio access technologies in the first and second frequency ranges; or carrier aggregation (CA) in at least one of the first and second frequency ranges.

Clause 4: The method of any one of Clauses 1-3, wherein the search and measurement is performed in the selected CCs using a plurality of UE beams.

Clause 5: The method of any one of Clauses 1-4, wherein: the second frequency range spans higher frequencies than the first frequency range; and one narrow band (NB) radio frequency (RF) chain is reserved for each frequency band of the second frequency range.

Clause 6: The method of any one of Clauses 1-5, wherein a single NB RF chain is used for search and measurement in all intra-band CCs of each frequency band.

Clause 7: The method of any one of Clauses 1-6, wherein the schedule dictates: beam sweeping a plurality of UE beams to perform search and measurement on a primary CC (PCC) at a first periodicity; and using a selected one of the plurality of UE beams to perform search and measurement on at least one secondary CC (SCC) at a second periodicity.

Clause 8: The method of any one of Clauses 1-7, selecting the UE beam used to perform search and measurement on the at least one SCC based on the beam sweeping of the plurality of UE beams to perform search and measurement on the PCC.

Clause 9: The method of any one of Clauses 1-8, wherein: the second frequency range spans higher frequencies than the first frequency range; and at least two narrow band (NB) radio frequency (RF) chains are reserved for the first frequency range.

Clause 10: The method of any one of Clauses 1-9, wherein the schedule is based on a timer maintained for each CC of the first frequency range.

Clause 11: The method of any one of Clauses 1-10, wherein a number of CCs, corresponding to a number of available narrow band (NB) radio frequency (RF) chains of the UE, are selected based on values of the timers maintained for each CC of the first frequency range.

Clause 12: The method of any one of Clauses 1-11, wherein, if multiple CCs have a same timer value, a CC with a shorter periodicity is given higher priority than a CC with a longer periodicity.

Clause 13: An apparatus, comprising: a memory comprising executable instructions; one or more processors configured to execute the executable instructions and cause the apparatus to perform a method in accordance with any one of Clauses 1-12.

Clause 14: An apparatus, comprising means for performing a method in accordance with any one of Clauses 1-12.

Clause 15: A non-transitory computer-readable medium comprising executable instructions that, when executed by one or more processors of an apparatus, cause the apparatus to perform a method in accordance with any one of Clauses 1-12.

Clause 16: A computer program product embodied on a computer-readable storage medium comprising code for performing a method in accordance with any one of Clauses 1-12.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and base station (BS) 102, next generation NodeB (gNB or gNodeB), access point (AP), distributed unit (DU), carrier, or transmission reception point may be used interchangeably. A BS 102 may provide communication coverage for a macro cell, a pico cell, a femto cell, and/or other types of cells.

A macro cell may generally cover a relatively large geographic area (e.g., several kilometers in radius) and may allow unrestricted access by user equipments (UEs) 104 with service subscription. A pico cell may cover a relatively small geographic area (e.g., a sports stadium) and may allow unrestricted access by UEs 104 with service subscription. A femto cell may cover a relatively small geographic area (e.g., a home) and may allow restricted access by UEs 104 having an association with the femto cell (e.g., UEs in a Closed Subscriber Group (CSG) and UEs 104 for users in the home). A BS 102 for a macro cell may be referred to as a macro BS. A BS 102 for a pico cell may be referred to as a pico BS. A BS 102 for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links (e.g., an S1 interface). BSs 102 configured for 5G (e.g., 5G NR or Next Generation RAN (NG-RAN)) may interface with 5GC 130 through second backhaul links 184. BSs 102 may communicate directly or indirectly (e.g., through the EPC 160 or 5GC 130) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs 102, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink (DL) and uplink (UL) (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 130 may include an Access and Mobility Management Function (AMF) 132, other AMFs 133, a Session Management Function (SMF), and a User Plane Function (UPF) 135. AMF 132 may be in communication with a Unified Data Management (UDM) 136.

AMF 132 is generally the control node that processes the signaling between UEs 104 and 5GC 130. Generally, AMF 132 provides QoS flow and session management.

All user Internet protocol (IP) packets are transferred through UPF 135, which is connected to the IP Services 137, and which provides UE IP address allocation as well as other functions for 5GC 130. IP Services 137 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the BS. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a BS for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of scheduling multiple component carriers (CCs) for both FR1 and FR2 in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
    selecting a number of component carriers (CCs) in both a first frequency range and a second frequency range, wherein the number of CCs corresponds to a number of available narrow band (NB) radio frequency (RF) chains of the UE and are selected based on a value of a timer maintained for each CC of the first frequency range;
    determining, based on the timer maintained for each CC of the first frequency range, a schedule for performing search and measurement in the selected number of CCs; and
    performing search and measurement in the selected CCs according to the determined schedule.

2. The method of claim 1, wherein the number of CCs exceeds a number of narrow band (NB) radio frequency (RF) chains of the UE.

3. The method of claim 1, wherein the number of CCs are used for at least one of:
    dual connectivity (DC) involving different radio access technologies in the first and second frequency ranges; or
    carrier aggregation (CA) in at least one of the first and second frequency ranges.

4. The method of claim 1, wherein the search and measurement is performed in the selected CCs using a plurality of UE beams.

5. The method of claim 4, wherein:
    the second frequency range spans higher frequencies than the first frequency range; and
    one narrow band (NB) radio frequency (RF) chain is reserved for each frequency band of the second frequency range.

6. The method of claim 5, wherein a single NB RF chain is used for search and measurement in all intra-band CCs of each frequency band.

7. The method of claim 5, wherein the schedule dictates:
    beam sweeping a plurality of UE beams to perform search and measurement on a primary CC (PCC) at a first periodicity; and
    using a selected one of the plurality of UE beams to perform search and measurement on at least one secondary CC (SCC) at a second periodicity.

8. The method of claim 7, further comprising selecting the UE beam used to perform search and measurement on the at least one SCC based on the beam sweeping of the plurality of UE beams to perform search and measurement on the PCC.

9. The method of claim 1, wherein:
    the second frequency range spans higher frequencies than the first frequency range; and
    at least two narrow band (NB) radio frequency (RF) chains are reserved for the first frequency range.

10. The method of claim 1, wherein, if multiple CCs have a same timer value, a CC with a shorter periodicity is given higher priority than a CC with a longer periodicity.

11. An apparatus for wireless communication by a user equipment (UE), comprising:
    at least one processor and a memory configured to:
        select a number of component carriers (CCs) in both a first frequency range and a second frequency range, wherein the number of CCs corresponds to a number of available narrow band (NB) radio frequency (RF) chains of the UE and are selected based on a value of a timer maintained for each CC of the first frequency range;
        determine, based on the timer maintained for each CC of the first frequency range, a schedule for performing search and measurement in the selected number of CCs; and
        perform search and measurement in the selected CCs according to the determined schedule.

12. The apparatus of claim 11, wherein the number of CCs exceeds a number of narrow band (NB) radio frequency (RF) chains of the UE.

13. The apparatus of claim 11, wherein the number of CCs are used for at least one of:
- dual connectivity (DC) involving different radio access technologies in the first and second frequency ranges; or
- carrier aggregation (CA) in at least one of the first and second frequency ranges.

14. The apparatus of claim 11, wherein the search and measurement is performed in the selected CCs using a plurality of UE beams.

15. The apparatus of claim 14, wherein:
- the second frequency range spans higher frequencies than the first frequency range; and
- one narrow band (NB) radio frequency (RF) chain is reserved for each frequency band of the second frequency range.

16. The apparatus of claim 15, wherein a single NB RF chain is used for search and measurement in all intra-band CCs of each frequency band.

17. The apparatus of claim 15, wherein the schedule dictates:
- beam sweeping a plurality of UE beams to perform search and measurement on a primary CC (PCC) at a first periodicity; and
- using a selected one of the plurality of UE beams to perform search and measurement on at least one secondary CC (SCC) at a second periodicity.

18. The apparatus of claim 17, further comprising selecting the UE beam used to perform search and measurement on the at least one SCC based on the beam sweeping of the plurality of UE beams to perform search and measurement on the PCC.

19. The apparatus of claim 11, wherein:
- the second frequency range spans higher frequencies than the first frequency range; and
- at least two narrow band (NB) radio frequency (RF) chains are reserved for the first frequency range.

20. The apparatus of claim 11, wherein, if multiple CCs have a same timer value, a CC with a shorter periodicity is given higher priority than a CC with a longer periodicity.

21. A non-transitory computer readable medium storing computer executable code thereon for wireless communication by a user equipment (UE), comprising:
- code for selecting a number of component carriers (CCs) in both a first frequency range and a second frequency range, wherein the number of CCs corresponds to a number of available narrow band (NB) radio frequency (RF) chains of the UE and are selected based on a value of a timer maintained for each CC of the first frequency range;
- code for determining, based on the timer maintained for each CC of the first frequency range, a schedule for performing search and measurement in the selected number of CCs; and
- code for performing search and measurement in the selected CCs according to the determined schedule.

22. The computer readable medium of claim 21, wherein the number of CCs exceeds a number of narrow band (NB) radio frequency (RF) chains of the UE.

23. The computer readable medium of claim 21, wherein the number of CCs are used for at least one of:
- dual connectivity (DC) involving different radio access technologies in the first and second frequency ranges; or
- carrier aggregation (CA) in at least one of the first and second frequency ranges.

24. An apparatus for wireless communication by a user equipment (UE), comprising:
- means for selecting a number of component carriers (CCs) in both a first frequency range and a second frequency range, wherein the number of CCs corresponds to a number of available narrow band (NB) radio frequency (RF) chains of the UE and are selected based on a value of a timer maintained for each CC of the first frequency range;
- means for determining, based on the timer maintained for each CC of the first frequency range, a schedule for performing search and measurement in the selected number of CCs; and
- means for performing search and measurement in the selected CCs according to the determined schedule.

25. The apparatus of claim 24, wherein the number of CCs exceeds a number of narrow band (NB) radio frequency (RF) chains of the UE.

26. The apparatus of claim 24, wherein the number of CCs are used for at least one of:
- dual connectivity (DC) involving different radio access technologies in the first and second frequency ranges; or
- carrier aggregation (CA) in at least one of the first and second frequency ranges.

* * * * *